(12) United States Patent
Yamane

(10) Patent No.: US 10,848,337 B2
(45) Date of Patent: Nov. 24, 2020

(54) MANAGEMENT DEVICE, CONTROL METHOD FOR MANAGEMENT DEVICE, AND CONTROL METHOD FOR MANAGEMENT SYSTEM

(71) Applicant: KYOCERA CORPORATION, Kyoto (JP)

(72) Inventor: Takeshi Yamane, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 82 days.

(21) Appl. No.: 15/501,968

(22) PCT Filed: Aug. 7, 2015

(86) PCT No.: PCT/JP2015/003990
§ 371 (c)(1),
(2) Date: Feb. 6, 2017

(87) PCT Pub. No.: WO2016/021208
PCT Pub. Date: Feb. 11, 2016

(65) Prior Publication Data
US 2017/0244575 A1    Aug. 24, 2017

(30) Foreign Application Priority Data

Aug. 7, 2014    (JP) ................................ 2014-161550

(51) Int. Cl.
*G06F 15/173*    (2006.01)
*H04L 12/28*    (2006.01)
(Continued)

(52) U.S. Cl.
CPC .......... *H04L 12/2825* (2013.01); *G06F 13/00* (2013.01); *H04L 67/125* (2013.01);
(Continued)

(58) Field of Classification Search
None
See application file for complete search history.

(56) References Cited

U.S. PATENT DOCUMENTS 10,006,653 B2    6/2018    Yabuta et al.
2005/0246309 A1    11/2005    Maekawa et al.
(Continued)

FOREIGN PATENT DOCUMENTS

JP    2004-032363 A    1/2004
JP    2004-127636 A    4/2004
(Continued)

OTHER PUBLICATIONS

Extended European Search Report dated Feb. 15, 2018, issued by the European Patent Office in counterpart European Patent Application No. 15 830549.0.
(Continued)

*Primary Examiner* — Brian Whipple
*Assistant Examiner* — Gregory P Tolchinsky
(74) *Attorney, Agent, or Firm* — Procopio Cory Hargreaves and Savitch LLP

(57) ABSTRACT

In order to provide a management apparatus that can reliably notify the user of the device state even when a device in a consumer's facility is operated via an external server, a management apparatus includes a first communication interface that transmits an operating instruction for devices in a consumer's facility to the devices, a storage that stores an operation history of the devices, and a second communication interface that transmits the operation history of the device to a server.

20 Claims, 3 Drawing Sheets

(51) Int. Cl.
*H04M 11/00* (2006.01)
*H04Q 9/00* (2006.01)
*G06F 13/00* (2006.01)
*H04L 29/08* (2006.01)

(52) U.S. Cl.
CPC .............. *H04M 11/00* (2013.01); *H04Q 9/00* (2013.01); *H04L 2012/285* (2013.01)

(56) References Cited

U.S. PATENT DOCUMENTS

| | | | | |
|---|---|---|---|---|
| 2006/0053219 | A1* | 3/2006 | Kutsumi | G06Q 30/02 709/224 |
| 2006/0288012 | A1 | 12/2006 | Maekawa et al. | |
| 2006/0288013 | A1 | 12/2006 | Maekawa et al. | |
| 2007/0005656 | A1 | 1/2007 | Maekawa et al. | |
| 2007/0112812 | A1* | 5/2007 | Harvey | H04L 61/1517 |
| 2008/0242370 | A1* | 10/2008 | Lando | H04L 51/04 455/574 |
| 2010/0014826 | A1* | 1/2010 | Kojo | G11B 27/034 386/278 |
| 2012/0083937 | A1 | 4/2012 | Kong et al. | |
| 2014/0068018 | A1* | 3/2014 | Roh | H04L 67/10 709/219 |
| 2015/0159894 | A1* | 6/2015 | Kadota | F24F 11/006 700/276 |
| 2015/0168166 | A1* | 6/2015 | Sakamoto | G05D 1/0214 701/400 |
| 2015/0308702 | A1* | 10/2015 | Yabuta | G05B 15/02 700/276 |
| 2016/0004231 | A1* | 1/2016 | Yoshimura | G08C 17/02 700/17 |
| 2016/0044661 | A1* | 2/2016 | Suresh | H04B 7/2656 370/337 |
| 2017/0111929 | A1* | 4/2017 | Ronneke | H04W 4/70 |

FOREIGN PATENT DOCUMENTS

| | | |
|---|---|---|
| JP | 2004-185612 A | 7/2004 |
| JP | 2006-323597 A | 11/2006 |
| JP | 2008-283433 A | 11/2008 |
| JP | 2010-108412 A | 5/2010 |
| JP | 2014-032574 A | 2/2014 |
| JP | 2014-096866 A | 5/2014 |
| WO | 2014/115317 A1 | 7/2014 |

OTHER PUBLICATIONS

International Search Report dated Oct. 27, 2015 issued by Japan Patent Office for International Application No. PCT/JP2015/003990.
Written Opinion of the International Searching Authority dated Oct. 27, 2015 issued by Japan Patent Office for International Application No. PCT/JP2015/003990.
Office Action dated Jul. 18, 2017 issued in counterpart Japanese Application No., 2016-539854.

* cited by examiner

FIG. 3

| Apparatus history No. | Device | Operation content | Operation time | Operation terminal |
|---|---|---|---|---|
| 1 | Air-conditioner | Temperature setting: 18 °C | 2014/07/22 PM 5:00 | Outdoor |
| 2 | Light | On | 2014/07/22 PM 6:00 | Indoor |
| 3 | Air-conditioner | Temperature setting: 29 °C | Unknown | Unknown |
| ... | ... | ... | ... | ... |

MANAGEMENT DEVICE, CONTROL METHOD FOR MANAGEMENT DEVICE, AND CONTROL METHOD FOR MANAGEMENT SYSTEM

CROSS-REFERENCE TO RELATED APPLICATION

This application claims priority to and the benefit of Japanese Patent Application No. 2014-161550 filed Aug. 7, 2014, the entire contents of which are incorporated herein by reference.

TECHNICAL FIELD

This disclosure relates to a management device, a control method for a management device, and a control method for a management system.

BACKGROUND

In recent years, technology has been developed to allow remote operation, from a communication terminal, of various devices such as household appliances, power control apparatuses, and the like installed in a consumer's facility. For example, JP 2014-32574 A (PTL 1) proposes an energy management system in which a communication terminal, such as a tablet computer, smartphone, or the like, is used to access an energy management apparatus and can operate devices targeted for management and confirm the status thereof.

CITATION LIST

Patent Literature

PTL 1: JP 2014-32574 A

SUMMARY

Technical Problem

One of the issues in such an energy management system is improvement of usability of the management apparatus.

Therefore, it would be helpful to provide a management apparatus that can improve usability.

Solution to Problem

A management apparatus according to this disclosure is a management apparatus including: a first communication interface configured to transmit an operating instruction for a device in a consumer's facility to the device; a storage configured to store an operation history of the device; and a second communication interface configured to transmit the operation history of the device to a server.

A control method for a management apparatus according to this disclosure is a control method for a management apparatus that manages a device in a consumer's facility, the control method including: transmitting an operating instruction for the device to the device; storing an operation history of the device; and transmitting the operation history of the device to a server.

A control method according to this disclosure is a control method for a management system, the management system including a management apparatus configured to manage a device in a consumer's facility, a server, and a terminal apparatus capable of providing an operating instruction for the device via the server and the management apparatus; and the control method including: the management apparatus transmitting an operating instruction for the device to the device; storing an operation history of the device; the management apparatus transmitting the operation history of the device to the server; and the terminal apparatus acquiring the operation history of the device from the server and displaying a history based on the operation history.

Advantageous Effect

The management device, control method for a management device, and control method for a management system according to this disclosure can improve the usability of a management device.

BRIEF DESCRIPTION OF THE DRAWINGS

In the accompanying drawings:

FIG. 3 illustrates an example of operating history stored in the management apparatus according to one of the disclosed embodiments.

DETAILED DESCRIPTION

The following describes various embodiments in detail with reference to the drawings.

Figure 1:
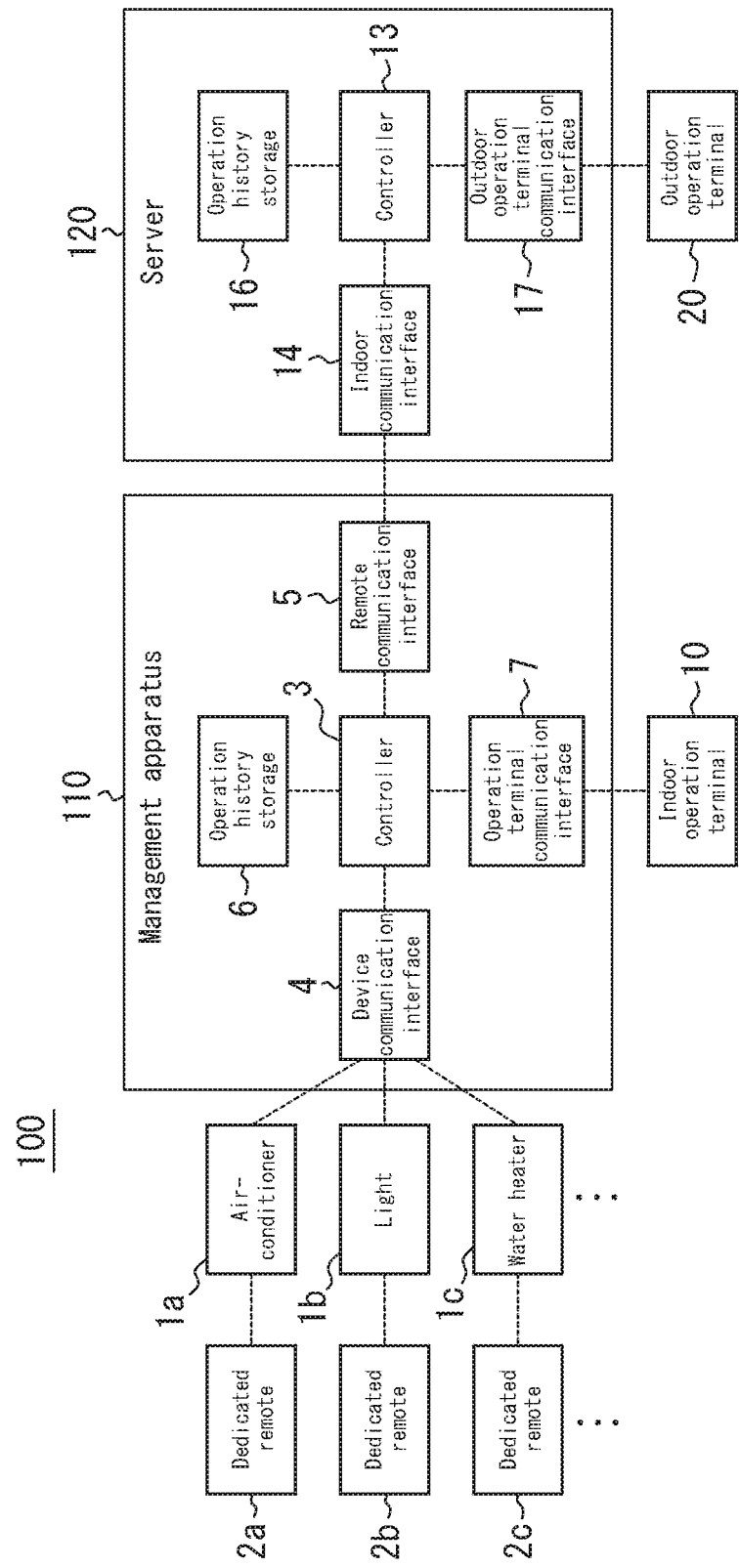
FIG. 1 is a block diagram illustrating a management system according to one of the disclosed embodiments.

FIG. 1 is a block diagram schematically illustrating the structure of a management system 100 according to one of the disclosed embodiments. In FIG. 1, the dashed lines represent the flow of control signals or transmitted information. The management system 100 according to this embodiment includes a management apparatus 110, a server 120, an indoor operation terminal 10, and an outdoor operation terminal 20. FIG. 1 shows devices 1a to 1c that are targeted for management by the management system 100 together with dedicated remote controls 2a to 2c for operating the devices.

The management apparatus 110 includes a controller 3, a device communication interface (first communication interface) 4, a remote communication interface (second communication interface) 5, an operation history storage (storage) 6, and an operation terminal communication interface 7. The management apparatus 110 receives operating instructions from the indoor operation terminal 10 via the operation terminal communication interface 7 and transmits the operating instructions to the devices 1a to 1c via the device communication interface 4 to operate the devices 1a to 1c.

The devices 1a to 1c are envisioned as being operated by the dedicated remote controls 2a to 2c, operated by the indoor operation terminal 10, or operated by the outdoor operation terminal 20. When operated by different methods simultaneously, operation is prioritized for example in the order of the dedicated remote controls 2a to 2c, the indoor operation terminal 10, and the outdoor operation terminal 20. For example, when different operating instructions are transmitted for the device 1a within a certain time period from the dedicated remote control 2a and the indoor operation terminal 10, the operation by the dedicated remote control 2a is prioritized.

By communicating regularly with the devices 1a to 1c, the management apparatus 110 receives the current status of the devices 1a to 1c from the devices 1a to 1c via the device communication interface 4. Regular communication between the management apparatus 110 and the devices 1a to 1c takes place by a request, from the device communication interface 4, at fixed intervals to transmit the status of the devices 1a to 1c. The transmission request is made by transmission from the device communication interface 4 to each of the devices 1a to 1c of a transmission request message.

The fixed intervals for regular communication may be set appropriately, for example for communication every 10 minutes. The fixed interval may change during the day, for example by being different during the day and the night, and may be changed based on the results of past operation history saved in the operation history storage 6.

When any of the devices 1a to 1c has been newly operated based on the condition of the devices 1a to 1c acquired from the devices 1a to 1c, the corresponding operation history is saved in the operation history storage 6. The operation history saved in the operation history storage 6 may be saved by accumulating past operation history. In greater detail, the operation history may, for example, be stored day by day or year by year. Alternatively, a configuration that stores only one instance of operation history may be adopted. In this case, the operation history is updated (overwritten) when a new operation of the devices 1a to 1c is received.

The management apparatus 110 communicates regularly with the server 120 via the remote communication interface 5 and transmits the operation history stored in the operation history storage 6 to the server 120. Communication between the management apparatus 110 and the server 120 is not limited to the case of regular communication. The management apparatus 110 may be configured to transmit updated operation history to the server 120 when the operation history is updated. Also, by communicating with the server 120, when the management apparatus 110 receives an operating instruction for the devices 1a to 1c that was issued to the server 120, the management apparatus 110 transmits the operating instruction to the devices 1a to 1c via the device communication interface 4 to cause the devices 1a to 1c to operate.

For example by including a microcomputer that executes a program and a memory that stores the program and a variety of information, the controller 3 can execute processing of the management apparatus 110 through software processing. The controller 3 may also be configured to execute processing of the management apparatus 110 through hardware processing.

The device communication interface 4 is an interface for the management apparatus 110 and the devices 1a to 1c to communicate. ECHONET Lite® (ECHONET Lite is a registered trademark in Japan, other countries, or both), which has been approved in Japan as a Home Energy Management System (HEMS) standard protocol, may be used as the communication protocol for operation in combination with a wireless LAN.

To communicate with and cause the devices 1a to 1c to operate, the management apparatus 110 may use a different standard communication protocol, in combination with a wireless LAN or the like, that provides a degree of freedom for the physical layer while regulating only the upper layer, such as the Smart Energy Profile 2.0 (SEP 2.0) of ZigBee® (ZigBee is a registered trademark in Japan, other countries, or both) or the like. Instead of a wireless LAN, a network connection may be established with a different standard communication protocol that regulates the physical layer, such as Ethernet® (Ethernet is a registered trademark in Japan, other countries, or both) or Power Line Communication (PLC). When connected over a wired connection, the device communication interface 4 of the management apparatus 110 and the devices 1a to 1c may perform wired communication.

The remote communication interface 5 is an interface for the management apparatus 110 and the server 120 to communicate. The management apparatus 110 is an apparatus connected to an indoor LAN and is not allocated a global IP address. On the other hand, the server 120 is an apparatus connected to the Internet and is allocated a global IP address. The management apparatus 110 is not limited to being an apparatus that is not allocated a global IP address and may instead be an apparatus that is allocated a global IP address.

Accordingly, the management apparatus 110 has a network configuration for access through a router or a gateway to the server 120 on the Internet. The connection between the management apparatus 110 and the router or gateway is typically made via Ethernet® or the like.

As a result of the management apparatus 110 communicating with the devices 1a to 1c and acquiring the status of the devices 1a to 1c, the operation history storage 6 saves the operation history when a new operation has been performed. The operation history storage 6 may, for example, be configured using a nonvolatile flash memory.

The operation terminal communication interface 7 is an interface for the management apparatus 110 and the indoor operation terminal 10 to communicate. The indoor operation terminal 10 is normally a wireless communication terminal such as a smartphone, and therefore a wireless LAN or the like is preferably used for this communication.

The indoor operation terminal 10 is normally the user's tablet computer, smartphone, or the like. A dedicated application for each of the devices 1a to 1c targeted for management may be installed on the indoor operation terminal 10, and the application may be used to operate the devices 1a to 1c and acquire the status thereof. When the management apparatus 110 and the devices 1a to 1c are configured to communicate with a standard protocol such as ECHONET Lite, a plurality of the devices 1a to 1c can be operated from the indoor operation terminal 10 by installing an application that conforms to the protocol.

Next, the structure and functions of the server 120 located on the Internet are described.

The server 120 is connected to the Internet and includes a controller 13, an indoor communication interface 14, an operation history storage 16, and an outdoor operation terminal communication interface 17. The server 120 receives operating instructions from the outdoor operation terminal 20 via the outdoor operation terminal communication interface 17 and transmits the operating instructions to the management apparatus 110 via the indoor communication interface 14 by regular communication to operate the devices 1a to 1c. The server 120 also receives the current status and the operation history of the devices 1a to 1c by regular communication with the management apparatus 110, and when a new operation has been performed, the server 120 saves the operation history in the operation history storage 16.

For example, by including a microcomputer that executes a program and a memory that stores the program and a variety of information, the controller 13 can execute processing of the server 120 through software processing. The controller 13 may also be configured to execute processing of the server 120 through hardware processing.

The indoor communication interface 14 is an interface for the server 120 to communicate with the management apparatus 110. The server 120 is normally connected to the Internet by Ethernet® or the like. As described above, the server 120 and the management apparatus 110 have a network configuration for communication through a router or a gateway.

The content of the stored operation history is the same between the operation history storage 16 of the server 120 and the operation history storage 6 of the management apparatus 110. The server 120 receives the operation history by regular communication with the management apparatus 110, and when a new operation has been performed, the server 120 saves the operation history in the operation history storage 16.

During regular communication between the server 120 and the management apparatus 110, the management apparatus 110 transmits the operation history from the remote communication interface 5 at fixed intervals. Transmission of the operation history may be regular and one-directional from the management apparatus 110. The operation history may be transmitted to the server 120 when the operation history saved in the operation history storage 16 is updated upon a new operation being performed.

The operation history may be transmitted by transmitting only the updated operation history or by transmitting the operation history for a certain past time period, including the updated operation history. Transmitting only the updated operation history has the advantage of reducing the amount of transmission data, whereas transmitting the operation history for a certain past time period has the advantage of making it possible to check the saved data for a certain past time period. The certain past time period may, for example, be set to one hour, one day, or the like. The operation history storage 16 as well may be configured using a flash memory or the like.

The outdoor operation terminal communication interface 17 is an interface for the server 120 and the outdoor operation terminal 20 to communicate. The outdoor operation terminal 20 is also normally a wireless communication terminal such as a smartphone, and therefore a wireless LAN or the like is preferably used for this communication.

In this embodiment, the server 120 is configured to connect over a network to the management apparatus 110 and the outdoor operation terminal 20 via the indoor communication interface 14 and the outdoor operation terminal communication interface 17, but the server 120 is not limited to this configuration. The server 120 may be configured to connect to the Internet over one communication interface and then communicate with both the management apparatus 110 and the outdoor operation terminal 20 over the Internet.

Like the indoor operation terminal 10, the outdoor operation terminal 20 is normally the user's tablet computer, smartphone, or the like. The outdoor operation terminal 20 may be configured by the same hardware as the indoor operation terminal 10, and one operation terminal may serve as both. An application for outdoor operation may be installed on the outdoor operation terminal 20, and the application may be used to operate the devices 1a to 1c and acquire the status thereof via the management apparatus 110.

Next, the devices 1a to 1c that are targeted for management by the management system 100 are described.

In this embodiment, the device 1a is an air-conditioner, the device 1b is a light, and the device 1c is a water heater. Dedicated remote controls 2a to 2c respectively accompany the devices 1a to 1c. The dedicated remote controls 2a to 2c are in one-to-one correspondence with the devices 1a to 1c, but a plurality of devices may be operated with one dedicated remote control.

The devices 1a to 1c do not store their respective operation histories. Rather, the devices 1a to 1c receive an operating instruction from the management apparatus 110, execute the operating instruction, and respond with the status after execution. Accordingly, when an operating instruction is issued from the dedicated remote controls 2a to 2c to the devices 1a to 1c, the management apparatus 110 cannot know the operation history. When there is a discrepancy between the operating instruction last transmitted by the management apparatus 110 to the devices 1a to 1c and information on the current status from the devices 1a to 1c, it can be inferred that an operation was performed with the dedicated remote controls 2a to 2c or the like, and the operation history can be modified. Details on modification of the operation history are provided below.

Figure 2:
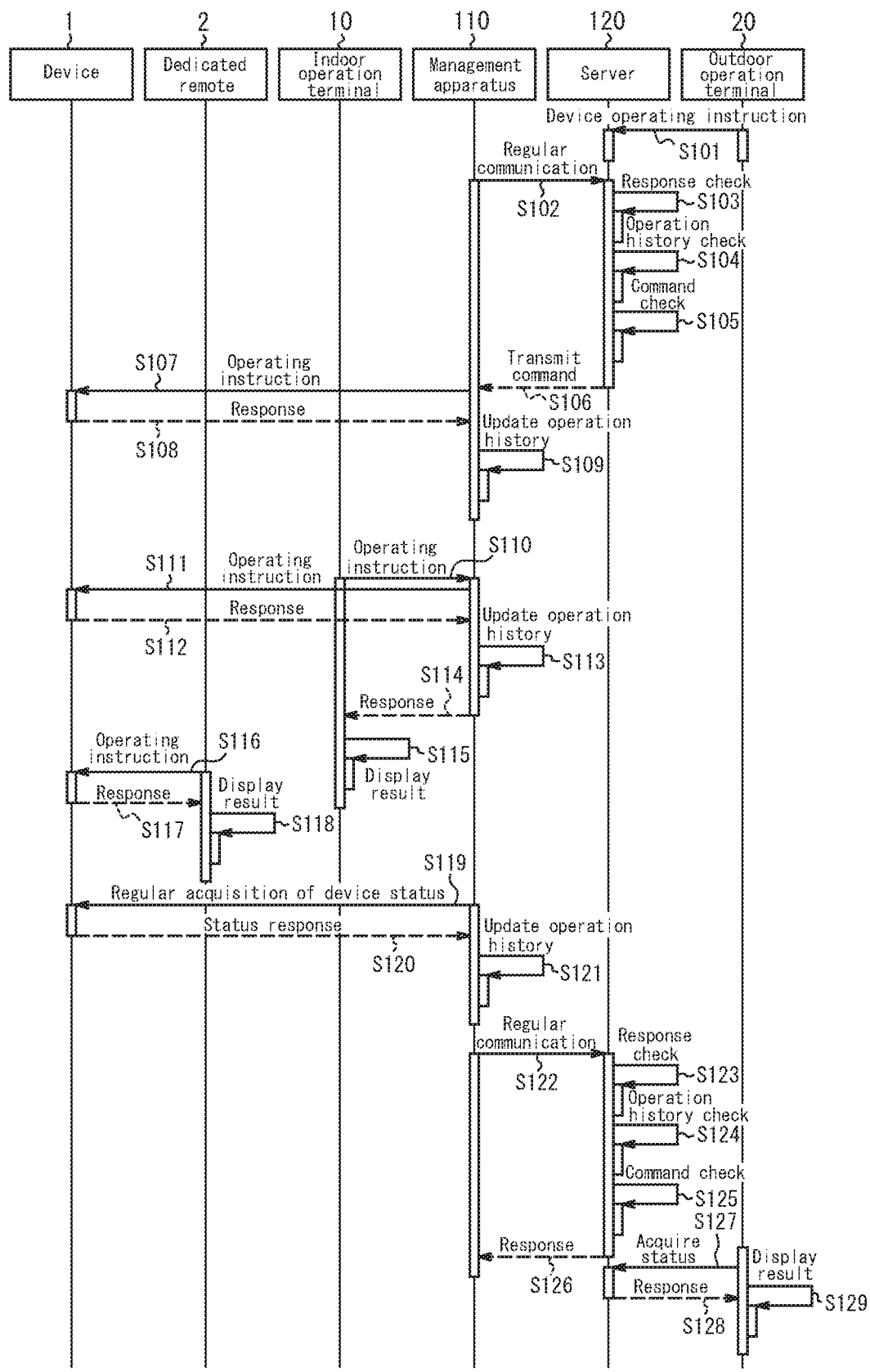
FIG. 2 is a control flowchart for a management system according to one of the disclosed embodiments.

Next, the control flow by the management system 100 according to one of the embodiments is described with reference to FIG. 2.

First, a device operating instruction (air-conditioner temperature setting: 18° C.) is provided from an application for outdoor operation installed on a smartphone, which is the outdoor operation terminal 20 (step S101). The operating instruction is transmitted to the server 120, which enters a state of waiting for access from the management apparatus 110.

The management apparatus 110 communicates with the server 120 regularly, such as once per minute (step S102). With this regular communication as a trigger, the server 120 performs a response check, for example to acquire the status of the devices 1a to 1c from the management apparatus 110 (step S103), an operation history check to acquire the operation history stored by the management apparatus 110 (step S104), and a command check to confirm whether there is an operating instruction from the outdoor operation terminal 20 (step S105). When there is an operating instruction from the outdoor operation terminal 20 in step S105 (in this embodiment, "air-conditioner temperature setting: 18° C."), the server 120 transmits the operating instruction to the management apparatus 110 (step S106).

Upon receiving the operating instruction from the server 120, the management apparatus 110 immediately transmits the operating instruction to the corresponding device (step S107). In this embodiment, the management apparatus 110 transmits the operating instruction to the device 1a (air-conditioner). The device 1a executes the operation upon receiving the operating instruction and changes the temperature setting to 18° C. Upon completing the operation, the device 1a transmits a response to the management apparatus 110 (step S108) and transmits the current post-operation status to the management apparatus 110.

When judging that a new operation has been performed based on the current status received from the device 1a, the management apparatus 110 updates the operation history (step S109) and saves the result in the operation history storage 6. The information indicated as operation history No. 1 in FIG. 3 is an example of the operation history that is added by steps S106 through S109. In this example, the device targeted for operation, the operation content, the operation time, and the type of operation terminal are recorded as operation history. The type of operation terminal for example includes the dedicated remote controls 2a to 2c, the indoor operation terminal 10, and the outdoor operation terminal 20.

Next, the case of an operating instruction for the devices 1a to 1c being issued from the indoor operation terminal 10 is described.

On the indoor operation terminal 10, an application for operating the devices 1a to 1c via the management apparatus 110 is launched, and the user transmits an operating instruction (light ON) for the device 1b (light) from the application (step S110).

Upon receiving the operating instruction from the indoor operation terminal 10, the management apparatus 110 immediately transmits the operating instruction to the corresponding device 1b (light) (step S111). The device 1b executes the operation upon receiving the operating instruction and changes the status of the light to ON. Upon completing the operation, the device 1b transmits a response to the management apparatus 110 (step S112) and transmits the current post-operation status to the management apparatus 110.

When judging that a new operation has been performed based on the current status received from the device 1b, the management apparatus 110 updates the operation history (step S113) and saves the result in the operation history storage 6. The information indicated as operation history No. 2 in FIG. 3 is an example of the operation history that is added by steps S110 through S113. In this example as well, the device targeted for operation, the operation content, the operation time, and the type of operation terminal are recorded as operation history.

Upon completing the updating of the operation history in step S113, the management apparatus 110 transmits a response to the indoor operation terminal 10 indicating that the operating instruction in step S110 is complete (step S114). Upon receiving a response from the management apparatus 110, the indoor operation terminal 10 displays, on its own display, the post-operation status of the device (step S115).

Next, the case of an operating instruction for the devices 1a to 1c being issued from the dedicated remote controls 2a to 2c is described.

Once the user transmits an operating instruction (air-conditioner temperature setting: 29° C.) from the dedicated remote control 2a for the device 1a (air-conditioner) (step S116), the device 1a receives the operating instruction and executes the operation to change the temperature setting to 29° C. Upon completing the operation, the device 1a transmits a response to the dedicated remote control 2a (step S117) and transmits the current post-operation status to the dedicated remote control 2a.

Upon receiving the response from the device 1a, the dedicated remote control 2a displays, on its own screen, the post-operation status of the device (step S118).

The management apparatus 110 communicates regularly with the devices 1a to 1c and requests acquisition of the current status (step S119). Upon receiving the request to acquire the status, the devices 1a to 1c issue a response to the management apparatus 110 (step S120) and transmit the current status to the management apparatus 110. The time interval over which the management apparatus 110 communicates with the devices 1a to 1c may, for example, be a 30 second interval.

When judging that a new operation has been performed based on the current status received from the devices 1a to 1c, the management apparatus 110 updates the operation history (step S121) and saves the result in the operation history storage 6. In this example, even though no operating instruction for "temperature setting: 29° C." has been transmitted to device 1a (air-conditioner) from the management apparatus 110, the current status of the device 1a is "temperature setting: 29° C.". Therefore, the management apparatus 110 infers that the operating instruction was issued from the dedicated remote control 2a and adds the operation history illustrated as operation history No. 3 in FIG. 3.

The management apparatus 110 communicates with the server 120 regularly, such as once per minute, and after one minute has passed since executing step S102, the management apparatus 110 communicates with the server 120 again (step S122). With this regular communication as a trigger, the server 120 again performs a response check, for example to acquire the state of the devices 1a to 1c from the management apparatus 110 (step S123), an operation history check to acquire the operation history stored by the management apparatus 110 (step S124), and a command check to confirm whether there is an operating instruction from the outdoor operation terminal 20 (step S125). Here, since there is no operating instruction from the outdoor operation terminal 20 in step S125, the server 120 issues a response to the management apparatus 110 indicating that steps S123 through S125 are complete (step S126).

The outdoor operation terminal 20 accesses the server 120, for example once every two minutes, and issues a request to acquire the state of the devices 1a to 1c (step S127). The server 120 responds to the request from the outdoor operation terminal 20 (step S128) and transmits the current status of the devices 1a to 1c. The server 120 compares the operating instruction transmitted from the outdoor operation terminal 20 with the operation history acquired from the management apparatus 110. When the operating instruction from the outdoor operation terminal 20 and the last operation history of the device match, the server 120 causes the current status to be displayed as is on the screen of the outdoor operation terminal 20. On the other hand, when the operating instruction from the outdoor operation terminal 20 and the last operation history of the device do not match, the server 120 transmits the operation history that subsequently interrupted indoors to the outdoor operation terminal 20 and makes the user view that operation history. This structure can prevent the user from feeling uncomfortable about nonconformity between the operating instruction that the user provided and the current status of the device.

The outdoor operation terminal 20 displays the state of each device received from the server 120 and the operation history as necessary on its own display (step S129).

In this embodiment, it is the server 120 that determines whether an operating instruction from the outdoor operation terminal 20 and the last operation history of the device match, but this configuration is not limiting. This processing may be executed on the outdoor operation terminal 20 instead.

As described above, according to this embodiment, the management apparatus 110 stores operation history for the devices 1a to 1c and regularly transmits the operation history to the server 120. Therefore, the user can recognize the current status of the devices 1a to 1c through the server 120.

On certain management systems, when an operation is performed for example with the dedicated remote control of a device after the user has performed an operation on the device from the outdoor operation terminal, the user who is outside is not notified of the state of the target device, even if that state is not the user's intended state. Hence, the usability is impaired.

Furthermore, according to this embodiment, the management apparatus 110 receives at least a portion of operating instructions for the devices 1a to 1c from the server 120, thereby allowing the user to operate the indoor devices 1a to 1c through the server 120.

According to this embodiment, the management apparatus 110 communicates with the server 120 at predetermined times and receives at least one of transmission of the operation history of the devices 1a to 1c and an operating instruction. As a result, without increasing the amount of communication, the user can operate and check on the state of the indoor devices 1a to 1c through the server 120.

According to this embodiment, based on an operating instruction transmitted by the management apparatus 110 to the devices 1a to 1c and on the state of the devices 1a to 1c acquired by the management apparatus 110, the operation history is modified. As a result, operating instructions from the dedicated remote controls and the like can also be managed as operation history.

According to this embodiment, the management apparatus 110 is an apparatus that is not allocated a global IP address and that accesses the server 120 on the Internet via a router or a gateway. Accordingly, by configuring the management apparatus 110 to communicate regularly with the server 120, the user can operate devices and confirm their state through the server 120 without increasing the amount of communication.

According to this embodiment, the operation history that is stored on the management apparatus 110 and transmitted to the server 120 includes information on the operation terminal that transmitted the operating instruction. Accordingly, even if the state of the devices 1a to 1c differs from the operating instruction provided by the user, the user can learn which terminal provided the operation reflected in the state of the device. As a result, the user can be prevented from feeling uncomfortable.

According to this embodiment, the time interval for storing the operation history of the devices 1a to 1c is set to be shorter than the time interval for transmitting the operation history of the devices to the server 120. As a result, even in a management system 100 in which the server 120 is connected to a plurality of management apparatuses 110, the burden on the server 120 can be reduced.

Although this disclosure is based on embodiments and drawings, it is to be noted that various changes and modifications will be apparent to those skilled in the art based on this disclosure. Therefore, such changes and modifications are to be understood as included within the scope of this disclosure. For example, the functions and the like included in the various components and steps may be reordered in any logically consistent way. Furthermore, components or steps may be combined into one or divided.

In the above embodiment, the case of the devices 1a to 1c not storing their own operation history is described, but the devices 1a to 1c may store operation history. In the case of the devices 1a to 1c storing operation history, the operation history is transmitted to the management apparatus 110 when an operating instruction for the devices 1a to 1c is provided from the dedicated remote controls 2a to 2c. When the devices 1a to 1c transmit the operation history to the management apparatus 110, the management apparatus 110 does not need to communicate regularly with the devices 1a to 1c.

Upon receiving an operating instruction from the dedicated remote controls 2a to 2c, the devices 1a to 1c may transmit the content of the operating instruction to the indoor communication interface 14 of the management apparatus 110. By the devices 1a to 1c transmitting the content of the operating instruction, the management apparatus 110 need not communicate regularly with the devices 1a to 1c or can reduce the frequency of regular communication.

In the above embodiment, examples of the devices 1a to 1c are load devices such as an air-conditioner, light, and water heater, but the devices may also for example be a storage battery, solar cell, fuel cell, or the like. When the devices 1a to 1c are a storage battery, solar cell, fuel cell, or the like, power generation conditions and the like are accumulated by regular communication.

Furthermore, when power command messages are supported, such as power restraint (demand response) that is restraint on the power flow or output restraint that is restraint on the reverse power flow, then the way in which power generated by the solar cell or fuel cell is consumed can be controlled by the indoor operation terminal 10 or the outdoor operation terminal 20. Upon operating the devices 1a to 1c when power command messages are supported, the resulting amount of suppression of power flow may also be saved in the operation history storage 6.

The state of the devices 1a to 1c stored in the operation history storage 6 can be confirmed from the indoor operation terminal 10. Therefore, for example before providing an operating instruction, the status of the devices 1a to 1c can be confirmed, and after the operating instruction is provided, it can be confirmed whether the devices 1a to 1c are operating in accordance with the operating instruction. In greater detail, the indoor operation terminal 10 issues a request for transmission of the operation history stored in the operation history storage 6 to the operation terminal communication interface 7. In response to the request for transmission from the indoor operation terminal 10, the controller 3 transmits the operation history stored in the operation history storage 6 to the indoor operation terminal 10 via the operation terminal communication interface 7. Note that the outdoor operation terminal 20 may confirm the state of the devices 1a to 1c stored in the operation history storage 16.

Much of the subject matter of this disclosure is described as a series of operations executed by a computer system and other hardware that can execute program instructions. Examples of the computer system and other hardware include a general-purpose computer, a Personal Computer (PC), a dedicated computer, a workstation, a Personal Communications System (PCS), an RFID receiver, an electronic notepad, a laptop computer, a Global Positioning System (GPS) receiver, and other programmable data processing apparatuses. It should be noted that in each embodiment, a variety of operations are executed by a dedicated circuit (for example, individual logical gates interconnected in order to execute a particular function) with built-in program instructions (software), or by a logical block, program module, or the like executed by one or more processors. The one or more processors that execute a logical block, program module, or the like are, for example, one or more of each of the following: a microprocessor, a central processing unit (CPU), an Application Specific Integrated Circuit (ASIC), a Digital Signal Processor (DSP), a Programmable Logic Device (PLD), a Field Programmable Gate Array (FPGA), a controller, a microcontroller, an electronic device, another apparatus designed to be capable of executing the functions disclosed here, and/or a combination of any of the above. The embodiments disclosed here are, for example, installed by hardware, software, firmware, middleware, microcode, or a combination of any of these. The instructions may be program code or a code segment for executing the necessary tasks. The instructions may be stored on a machine-readable, non-transitory storage medium or other medium. The code segment may indicate a combination of any of the following: procedures, functions, subprograms, programs, routines, subroutines, modules, software packages, classes or instructions, data structures, or program statements. The code segment may transmit and/or receive information, data arguments, variables, or memory content to or from another code segment or hardware circuit in order for the code segment to connect to another code segment or hardware circuit.

The network used here may, unless indicated otherwise, be the Internet, an ad hoc network, a Local Area Network (LAN), a cellular network, a Wireless Personal Area Network (WPAN), another network, or a combination of any of these. The constituent elements of a wireless network for example include an access point (such as a Wi-Fi access point), a femtocell, and the like. Furthermore, a wireless communication device can connect to a wireless network that uses Wi-Fi, Bluetooth® (Bluetooth is a registered trademark in Japan, other countries, or both), cellular communication technology (such as Code Division Multiple Access (CDMA), Time Division Multiple Access (TDMA), Frequency Division Multiple Access (FDMA), Orthogonal Frequency Division Multiple Access (OFDMA), or Single-Carrier Frequency Division Multiple Access (SC-FDMA)), or other wireless technology and/or technical standards.

The machine-readable, non-transitory storage medium used here may also be configured by a computer-readable, tangible carrier (medium) in the categories of solid-state memory, magnetic disks, and optical discs. Data structures and an appropriate set of computer instructions, such as program modules, for causing a processor to execute the techniques disclosed here are stored on these media. Examples of computer-readable media include an electrical connection with one or more wires, a magnetic disk storage medium, a magnetic cassette, a magnetic tape, or other magnetic or optical storage medium (such as a Compact Disc (CD), laser Disc®, Digital Versatile Disc (DVD®), Floppy® disk, and Blu-ray Disc® (laser disc, DVD, floppy, and Blu-ray disc are each a registered trademark in Japan, other countries, or both)), portable computer disk, random access memory (RAM), read-only memory (ROM), rewritable programmable ROM such as EPROM, EEPROM, or flash memory, another tangible storage medium that can store information, or a combination of any of these. The memory may be provided internal and/or external to a processor/processing unit. As used in this disclosure, the term "memory" refers to all types of long-term storage, short-term storage, volatile, non-volatile, or other memory. No limitation is placed on the particular type or number of memories, or on the type of medium for memory storage.

While the disclosed system has a variety of modules and/or units for implementing particular functions, these modules and units have only been indicated schematically in order to briefly illustrate the functionality thereof. It should be noted that no particular hardware and/or software is necessarily indicated. In this sense, it suffices for the modules, units, and other constituent elements to be hardware and/or software implemented so as to substantially execute the particular functions described here. The various functions of different constituent elements may be combined with or separated from hardware and/or software in any way, and each may be used individually or in some combination. An input/output (I/O) device or user interface including, but not limited to, a keyboard, display, touchscreen, pointing device, or the like may be connected to the system directly or via an intermediate I/O controller. In this way, the various subject matter disclosed herein may be embodied in a variety of forms, and all such embodiments are included in the scope of the subject matter in this disclosure.

REFERENCE SIGNS LIST

1a Device (air-conditioner)
1b Device (light)
1c Device (water heater)
2a, 2b, 2c Dedicated remote control
3 Controller
4 Device communication interface (first communication interface)
5 Remote communication interface (second communication interface)
6 Operation history storage (storage)
7 Operation terminal communication interface
10 Indoor operation terminal
13 Controller
14 Indoor communication interface
16 Operation history storage
17 Outdoor operation terminal communication interface
20 Outdoor operation terminal
100 Management system
110 Management apparatus
120 Server

The invention claimed is:

1. A management apparatus comprising:
a first communication interface configured to transmit operating instructions from operation terminals, including an indoor operation terminal and an outdoor operation terminal that is outside the consumer's facility, for a device in a consumer's facility to the device;
a storage configured to store an operation history of the device by the operation terminals and a dedicated remote control that operates the device directly; and
a second communication interface configured to transmit the operation history of the device by the dedicated remote control to a server that is to, when an operating instruction is received from the outdoor operation terminal,
compare the operating instruction from the outdoor operation terminal to the operation history, and,
only when a discrepancy is detected between the operating instruction from the outdoor operation terminal and the latest operation history of the device, send the operation history of the device that interrupted the operating instruction from the outdoor operation terminal to the outdoor operation terminal, so that the operation history is displayed on the outdoor operation terminal so that a user of the outdoor operation terminal can view the operation history.

2. The management apparatus of claim 1, wherein the second communication interface receives at least a portion of operating instructions for the device transmitted by the first communication interface from the server.

3. The management apparatus of claim 2, wherein the second communication interface accesses the server at a first predetermined time, and with the server, performs at least one of transmission of the operation history and receipt of the operating instruction.

4. The management apparatus of claim 3, wherein the second communication interface communicates regularly with the server and transmits the operation history to the server.

5. The management apparatus of claim 2, wherein the second communication interface communicates regularly with the server and transmits the operation history to the server.

6. The management apparatus of claim 2, wherein when the operation history stored in the storage is updated, the second communication interface transmits the updated operation history to the server.

7. The management apparatus of claim 1, wherein the second communication interface communicates regularly with the server and transmits the operation history to the server.

8. The management apparatus of claim 1, wherein when the operation history stored in the storage is updated, the second communication interface transmits the updated operation history to the server.

9. The management apparatus of claim 8, wherein the operation history that the second communication interface transmits to the server is operation history for a certain past time period including the updated operation history.

10. The management apparatus of claim 8, wherein the operation history that the second communication interface transmits to the server is only the updated operation history.

11. The management apparatus of claim 1, wherein the first communication interface acquires a state of the device from the device at a second predetermined time.

12. The management apparatus of claim 11, wherein the first communication interface acquires a state of the device by communicating regularly with the device.

13. The management apparatus of claim 11, wherein the storage modifies and stores the operation history based on the operating instruction transmitted to the device by the first communication interface and on the state.

14. The management apparatus of claim 1, wherein the first communication interface acquires a state of the device from the device by transmitting a message to the device to request transmission of the state of the device.

15. The management apparatus of claim 1, wherein the management apparatus is not allocated a global IP address and accesses the server that is on the Internet via a router or a gateway.

16. The management apparatus of claim 1, wherein the operation history includes information on an operation terminal that transmitted the operating instruction.

17. The management apparatus of claim 1, wherein a time interval of storing the operation history of the device is shorter than a time interval of transmitting the operation history of the device to the server.

18. The management apparatus of claim 1, further comprising:
an operation terminal communication interface capable of communicating with an operation terminal;
wherein in response to a request from the operation terminal, the management apparatus transmits the operation history stored in the storage to the operation terminal via the operation terminal communication interface.

19. A control method for a management apparatus that manages a device in a consumer's facility, the control method comprising:
transmitting operating instructions for the device from operation terminals, including an indoor operation terminal and an outdoor operation terminal that is outside the consumer's facility, to the device;
storing an operation history of the device by the operation terminals and a dedicated remote control that operates the device directly; and
transmitting the operation history of the device by the dedicated remote control to a server that is to, when an operating instruction is received from the outdoor operation terminal,
compare the operating instruction from the outdoor operation terminal to the operation history, and, only when a discrepancy is detected between the operating instruction from the outdoor operation terminal and the latest operation history of the device, send the operation history of the device that interrupted the operating instruction from the outdoor operation terminal to the outdoor operation terminal, so that the operation history is displayed on the outdoor operation terminal so that a user of the outdoor operation terminal can view the operation history.

20. A control method for a management system, the management system comprising a management apparatus configured to manage a device in a consumer's facility, a server, and operation terminals capable of providing an operating instruction for the device via the server and the management apparatus; and the control method comprising:
the management apparatus transmitting operating instructions for the device from the operation terminals, including an indoor operation terminal and an outdoor operation terminal that is outside the consumer's facility, to the device;
storing an operation history of the device by the management apparatus;
the management apparatus transmitting the operation history of the device to the server, that is to, when an operating instruction is received from the outdoor operation terminal,
compare the operating instruction from the outdoor operation terminal to the operation history, and,
only when a discrepancy is detected between the operating instruction from the outdoor operation terminal and the latest operation history of the device, send the operation history of the device that interrupted the operating instruction from the outdoor operation terminal to the outdoor operation terminal, so that the operation history is displayed on the outdoor operation terminal so that a user of the outdoor operation terminal can view the operation history.

* * * * *